United States Patent
Hui et al.

(10) Patent No.: US 8,908,626 B2
(45) Date of Patent: Dec. 9, 2014

(54) ON-DEMAND PAIR-WISE FREQUENCY-HOPPING SYNCHRONIZATION

(75) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 309 days.

(21) Appl. No.: 13/566,875

(22) Filed: Aug. 3, 2012

(65) Prior Publication Data

US 2013/0279540 A1 Oct. 24, 2013

Related U.S. Application Data

(60) Provisional application No. 61/636,295, filed on Apr. 20, 2012.

(51) Int. Cl.
- *H04W 72/04* (2009.01)
- *H04L 1/16* (2006.01)
- *H04W 72/12* (2009.01)
- *H04L 1/00* (2006.01)

(52) U.S. Cl.
CPC ......... *H04W 72/0406* (2013.01); *H04L 1/1607* (2013.01); *H04W 72/1205* (2013.01); *H04W 72/1289* (2013.01); *H04L 2001/0093* (2013.01)
USPC ............................ 370/329; 370/328; 370/348

(58) Field of Classification Search
USPC ....................................................... 370/329
See application file for complete search history.

(56) References Cited

U.S. PATENT DOCUMENTS

| | | | |
|---|---|---|---|
| 5,146,514 A | 9/1992 | Birk | |
| 6,941,110 B2 | 9/2005 | Kloper et al. | |
| 7,050,452 B2 | 5/2006 | Sugar et al. | |
| 7,408,907 B2 | 8/2008 | Diener | |
| 8,104,993 B2 * | 1/2012 | Hitt et al. | 405/37 |

(Continued)

FOREIGN PATENT DOCUMENTS

| | | |
|---|---|---|
| WO | WO-0128170 A2 | 4/2001 |
| WO | WO-2009009687 A2 | 1/2009 |

OTHER PUBLICATIONS

Klos, Lawrence, "Reliable Multicast in Mobile Ad Hoc Wireless Networks," Dec. 2009, pp. 16 and 17.*

(Continued)

*Primary Examiner* — Dang Ton
*Assistant Examiner* — Robert M Morlan
(74) *Attorney, Agent, or Firm* — Parker Ibrahim & Berg LLC; James M. Behmke; Stephen D. LeBarron

(57) ABSTRACT

In one embodiment, a device receives and stores a broadcast schedule, and may determine whether a neighbor unicast listening schedule is available for a neighboring device. If so, the device may transmit a data frame to the neighboring device pursuant to the neighbor unicast listening schedule. If a neighbor unicast listening schedule is not available, the device may transmit the data frame to the neighboring device pursuant to a broadcast schedule. Once the data frame is received by the neighboring device, pursuant to the neighbor unicast listening schedule or the broadcast schedule, an acknowledgement may be received from the neighboring device, which may include an updated neighbor unicast listening schedule for that neighboring device.

20 Claims, 10 Drawing Sheets

(56) References Cited

U.S. PATENT DOCUMENTS

| | | | |
|---|---|---|---|
| 8,442,092 B2* | 5/2013 | San Filippo et al. | ......... 375/132 |
| 2010/0214995 A1 | 8/2010 | Iyer et al. | |
| 2011/0075704 A1 | 3/2011 | Bettendorff et al. | |

OTHER PUBLICATIONS

Hui, et al., "On-Demand Pair-Wise Frequency-Hopping Synchronization", U.S. Appl. No. 61/636,295, filed Apr. 20, 2012, 38 pages.

Winter; et al., "RPL: IPv6 Routing Protocol for Low-Power and Lossy Networks", Internet Engineering Task Force, Request for Comments 6550, Mar. 2012, 158 pages.

Lampreia, et al., "Notification of Transmittal of the International Search Report and the Written Opinion of the International Searching Authority, or the Declaration", Patent Cooperation Treaty, International Application No. PCT/US2013/037572, 9 pages, European Patent Office, Rijswijk, Netherlands.

* cited by examiner

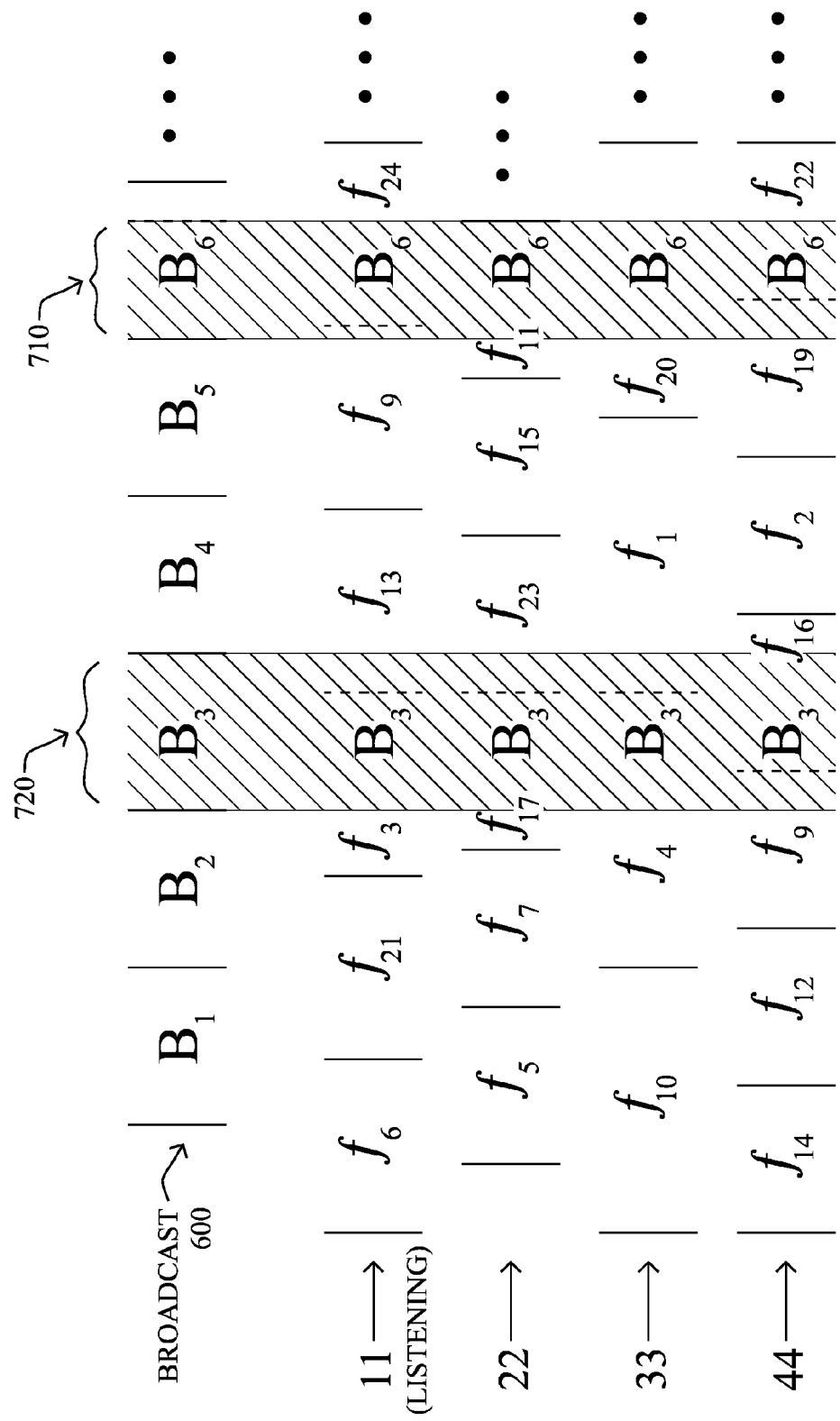

ON-DEMAND PAIR-WISE FREQUENCY-HOPPING SYNCHRONIZATION

RELATED APPLICATION

The present application claims priority to U.S. Provisional Patent Application Ser. No. 61/636,295, filed Apr. 20, 2012, entitled ON-DEMAND PAIR-WISE FREQUENCY-HOPPING SYNCHRONIZATION, by Hui et al, the contents of which are hereby incorporated by reference.

TECHNICAL FIELD

The present disclosure relates generally to shared-media communication, and, more particularly, to frequency-hopping synchronization.

BACKGROUND

In a frequency-hopping (or channel-hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time. Alternatively, all devices in a network may synchronize with a single channel schedule such that all devices transmit and receive on the same channel at any time.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8 illustrates an example broadcast schedule overlaid on independent unicast sequences.

DESCRIPTION OF EXAMPLE EMBODIMENTS

Overview

Figure 1:
FIG. 1 illustrates an example wireless network.

According to one or more aspects of the disclosure, a device receives and stores a broadcast schedule, and may determine whether a neighbor unicast listening schedule is available for a neighboring device. If so, the device may transmit a data frame to the neighboring device pursuant to the neighbor unicast listening schedule. If a neighbor unicast listening schedule is not available, the device may transmit the data frame to the neighboring device pursuant to a broadcast schedule. Once the data frame is received by the neighboring device, pursuant to the neighbor unicast listening schedule or the broadcast schedule, an acknowledgement may be received from the neighboring device, which may include an updated neighbor unicast listening schedule for that neighboring device.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example (and vastly simplified) computer network 100 (e.g., wireless or otherwise) illustratively comprising nodes/devices 200 (e.g., labeled as shown, 11, 22, 33, and 44) interconnected by frequency-hopping communication links 105, as described below. In particular, certain nodes/devices 200, such as, e.g., routers, sensors, computers, radios, etc., may be in communication with other nodes/devices 200, e.g., based on distance, signal strength, current operational status, location, etc. Those skilled in the art will understand that any number of nodes/devices, links, etc. may be used in the wireless network, and that the view shown herein is for simplicity (particularly, that while routers are shown, any wireless communication devices 11, 22, 33, 44 may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc., sent between the devices/nodes) may be exchanged among nodes/devices 200 of computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
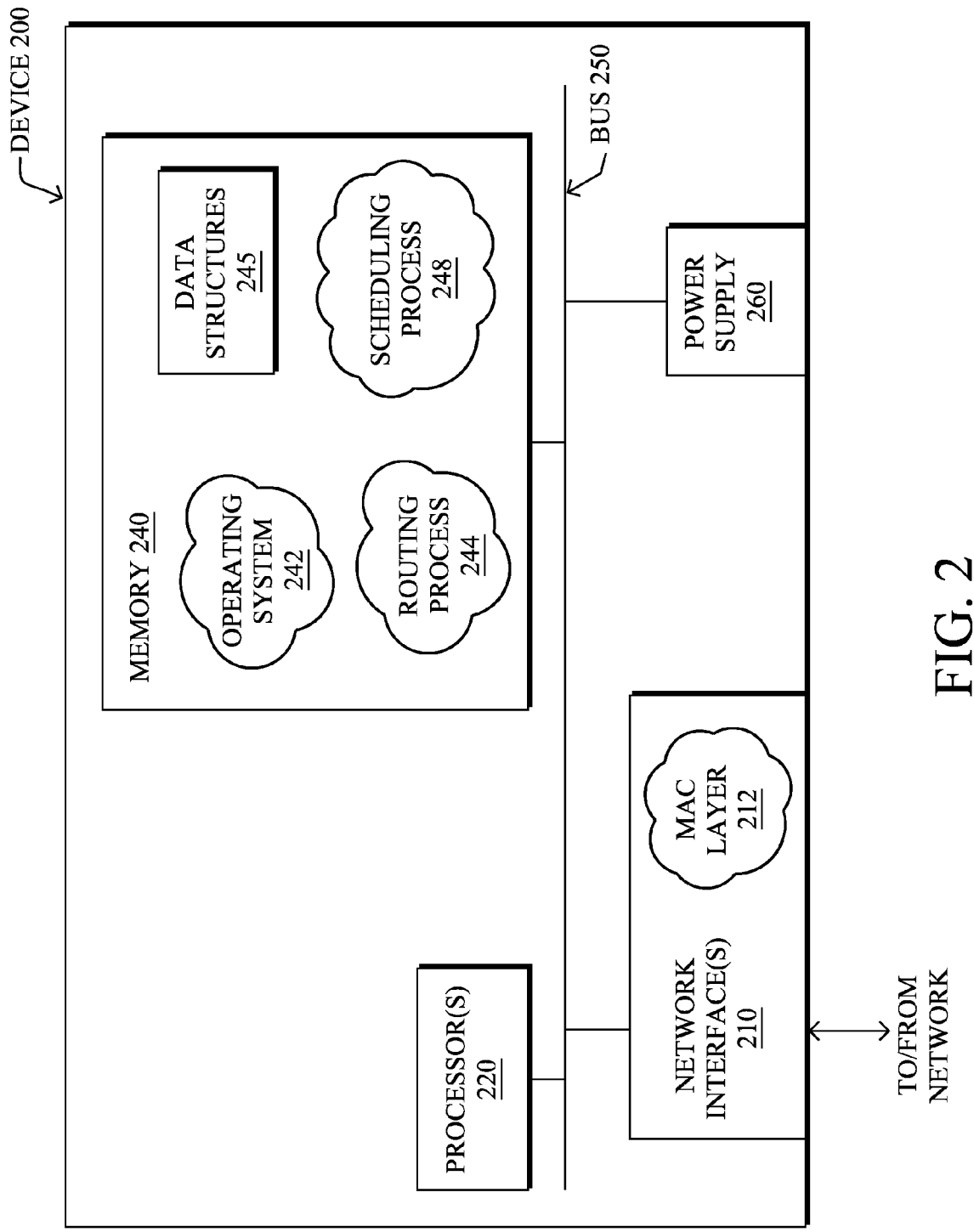
FIG. 2 illustrates an example wireless device/node.

FIG. 2 is a schematic block diagram of an example node/device 200 that may be used with one or more embodiments described herein, e.g., as nodes 11, 22, 33, or 44. Device 200 may comprise one or more network interfaces 210 (e.g., wireless/frequency-hopping), at least one processor 220, and a memory 240, interconnected by a system bus 250, as well as a power supply 260 (e.g., plug-in, battery, etc.).

Network interface(s) 210 (e.g., transceivers or simply "radios") include the mechanical, electrical, and signaling circuitry for communicating data over wireless links 105 in network 100. Network interface(s) 210 may be configured to transmit and/or receive data using one or more different communication protocols as noted above, and as will be understood by those skilled in the art, particularly for frequency-hopping communication as described herein. In addition, network interfaces 210 may comprise an illustrative media access control (MAC) layer module 212 (and other layers, such as the physical or "PHY" layer, as will be understood by those skilled in the art). Nodes/devices 200 may also have one or more different types of network interface(s) 210, namely, wireless and wired/physical connections, and that the view herein is merely for illustration. Also, while network interface 210 is shown separately from power supply 260, for PLC network interface 210 may communicate through power supply 260, or may be an integral component of power supply 260. In some specific configurations the PLC signal may be coupled to the power line feeding into the power supply.

Memory 240 comprises a plurality of storage locations that are addressable by processor 220 and network interface 210 for storing software programs and data structures associated with the embodiments described herein. Note that certain devices may have limited memory or no memory (e.g., no memory for storage other than for programs/processes operating on the device). Processor 220 may comprise necessary elements or logic adapted to execute the software programs and manipulate data structures 245. An operating system 242, portions of which are typically resident in memory 240 and executed by processor 220, functionally organizes device 200 by, inter alia, invoking operations in support of software processes and/or services executing on device 200. These software processes and/or services may comprise routing process/services 244 and an illustrative scheduling process 248 as described in greater detail below. Note that while scheduling process 248 is shown in centralized memory 240, alternative embodiments provide for the mode selection process to be specifically operated within network interface 210, such as a component of MAC layer 212.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by processor 220 to perform functions provided by one or more routing protocols, such as proactive or reactive routing protocols, as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs may be comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows, window shades, blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) for use in routing data transmissions 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

In conventional systems, frequency-hopping schedules (channel schedules) may be assigned to each transmitter-receiver pair independently (unicast schedules) so that neighboring transmitter-receiver pairs can communicate simultaneously on different channels. Each node/device 200 maintains its own channel-hopping schedule for receiving unicast messages, thus independently determining a "local unicast listening schedule" for each device. A unicast schedule may defined by the following parameters:

1) Channel Sequence: a list of channels, e.g., indexed by a 16-bit integer, that a mesh interface follows when listening for unicast transmissions. Each entry in the Channel Sequence may be determined by a function that is based on a unique identifier of the device, e.g., the interface's MAC address, and the list index. Using the MAC address helps ensure that neighboring nodes do not follow the same pseudo-random sequence and reduces the chance of repeated collisions by neighboring transmitter-receiver pairs.
2) Slot Duration: the unicast schedule divides time into equal sized slots. A node/device 200 listens to a single channel for the entire duration of a slot. At the beginning of each slot, the node switches to the next channel in the unicast schedule for listening. Each independently determined unicast listening schedule can be independently timed, i.e., the slots (timeslots, sub-timeslots, etc.) need not align between different devices schedules.

Such a strategy increases aggregate network capacity for unicast communication, but is inefficient for broadcast communication. One challenge with unicast schedules is that synchronizing with neighbors' unicast schedules is costly. A device must maintain per-neighbor state for each neighbor it is synchronized with. Furthermore, a device must periodically communicate with their neighbors to correct for clock drift. As a result, the cost of maintaining unicast schedule synchronization grows linearly with the number of neighbors the device is trying to maintain synchronization with.

For example, in large-scale networks in urban environments (e.g., LLNs, such as for Smart Grid and Smart Cities), it is common for devices to have hundreds of neighbors. Even more challenging is the unpredictability of node densities in real-world deployments, making it difficult to effectively provision memory in node hardware. Maintaining unicast schedules with all neighbors may not be feasible with available resources (e.g., memory and channel capacity).

Alternatively, all devices in a network may synchronize with a single channel schedule (broadcast schedule) such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

The two approaches above (unicast schedules and broadcast schedules) trade aggregate capacity for unicast communication with efficient broadcast communication. In an attempt to balance these tradeoffs, a more enhanced technique utilizes a hybrid approach, where nodes maintain their own individual channel-hopping schedules for efficient unicast communication while, at the same time, synchronize to a network-wide broadcast schedule that allows broadcast communication for a fraction of the time. In other words, the devices overlay the network-wide broadcast schedule on top of their individual unicast schedule. This hybrid approach may be generally premised on the following factors:

1) having each device determine its own unicast schedule independent of all other devices;
2) synchronizing the network to a common broadcast schedule that also indicates when devices listen for broadcast transmissions instead of unicast transmissions;
3) transmitting unicast messages according to the listening schedules determined by the receiver; and
4) transmitting broadcast messages according to the broadcast schedule.

However, in this hybrid approach, if no unicast information exists or the unicast schedule information is erroneous when sending a unicast message, the device simply drops the unicast frame.

Figure 3:
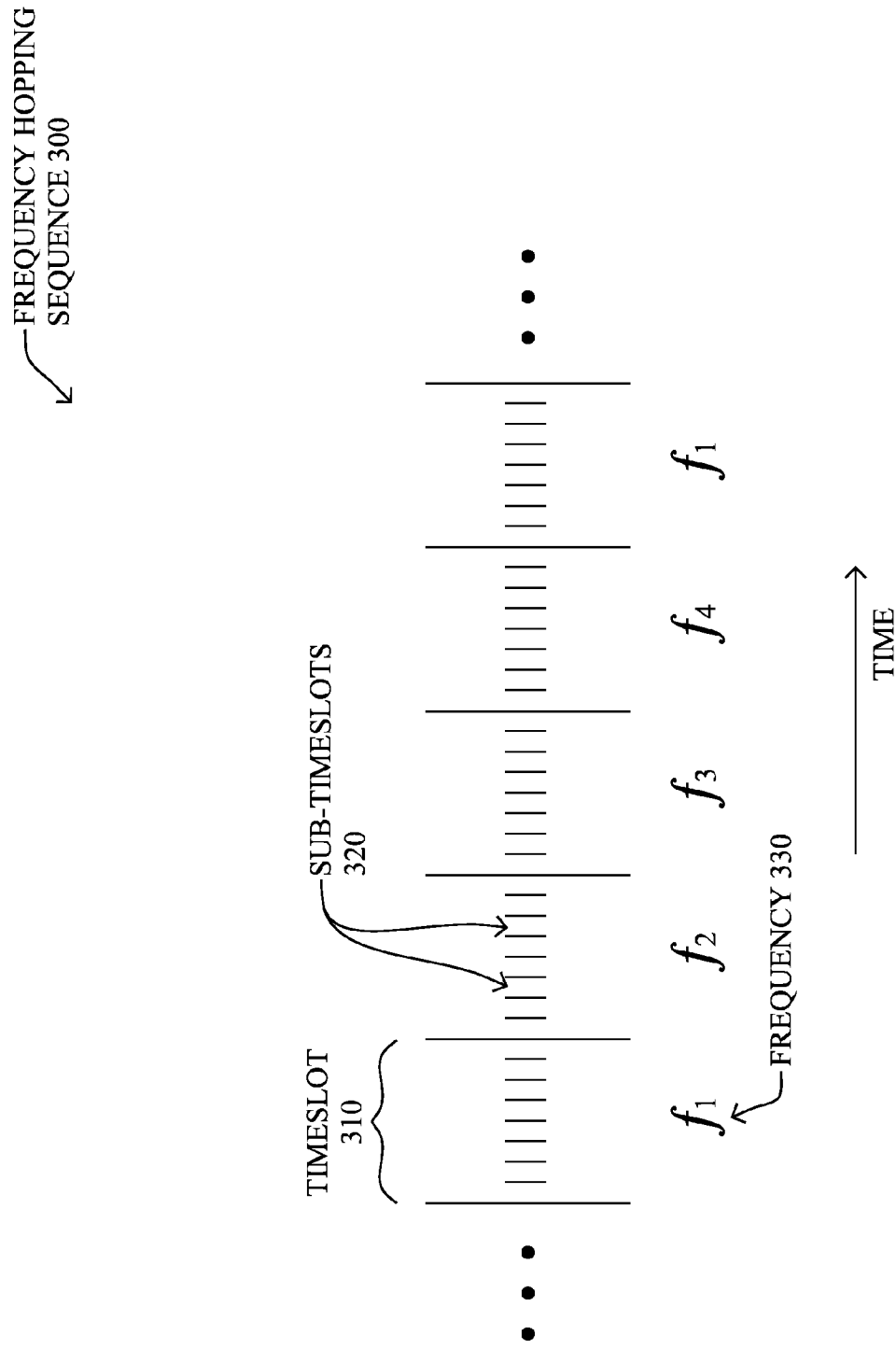
FIG. 3 illustrates an example frequency-hopping sequence.

In general, as shown in FIG. 3, in frequency-hopping wireless networks, time frames are divided within a frequency-hopping sequence 300 into regular timeslots 310, each one operating on a different frequency 330 (e.g., $f_1$-$f_4$). A reference clock may be provided for the time frames for an entire network (e.g., mesh/cell), or at least between pairs of communicating devices. MAC layer 212 of each device 200 divides time into timeslots that are aligned with the timeslot boundary of its neighbor. Also, each timeslot 310 may be further divided into sub-timeslots 320. However, not all frequency-hopping systems use sub-timeslots, and devices can begin transmission at any time within a timeslot. The view herein is merely one example. Illustratively, MAC layer 212 is in charge of scheduling the timeslot 310 in which a data transmission 140 is sent, the main objective of which generally being randomization of the transmission time in order to avoid collisions with neighbors' transmissions. MAC layer 212 must not only schedule the data transmissions 140 coming from upper layers of a protocol stack, but it also must schedule its own data transmissions 140 (e.g., acknowledgements, requests, beacons, etc.).

Figure 4A:
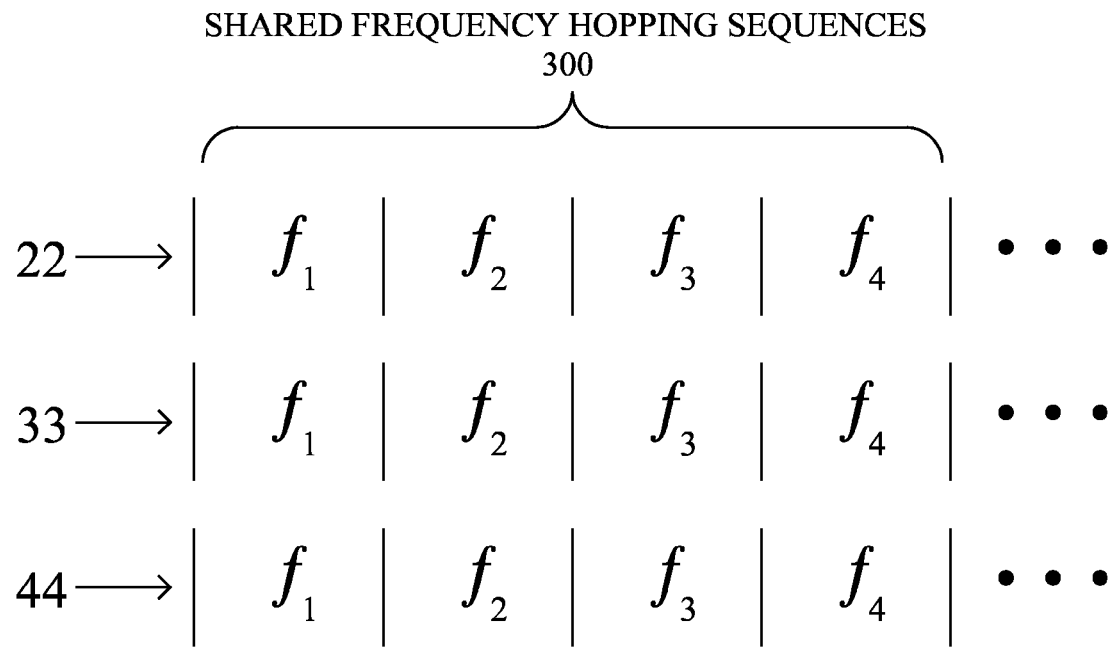
FIGS. 4A-4B illustrate additional examples of frequency-hopping sequences.

A device 200 in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4A, in which each receiver (e.g. device/nodes 11, 22, 33, and 44) are all configured with the same sequence.

Figure 4B:
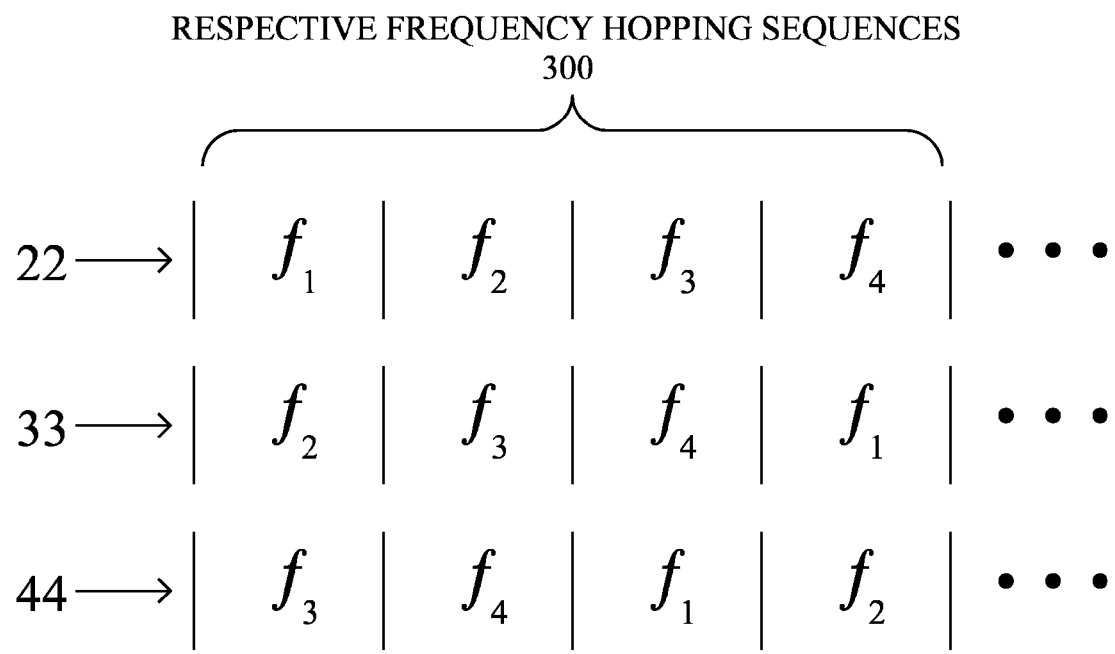

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel-hopping network may individually pick their own hopping schedule parameters independent of any other node, as is shown in FIG. 4B. Note that the offset of the frequencies (i.e., the fact that the same four frequencies ($f_1$-$f_4$) are used in the same order, just offset by one timeslot 310) is merely one illustration, and the sequences and frequencies can be independently chosen. Also, note that while timeslots 310 are shown as being synchronized between different nodes/devices 200, those skilled in the art will appreciate that timeslots 310 between different nodes/devices 200 can, in fact, be out-of-phase, and may have no relationship with each other.

A device 200 synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

Figure 5:
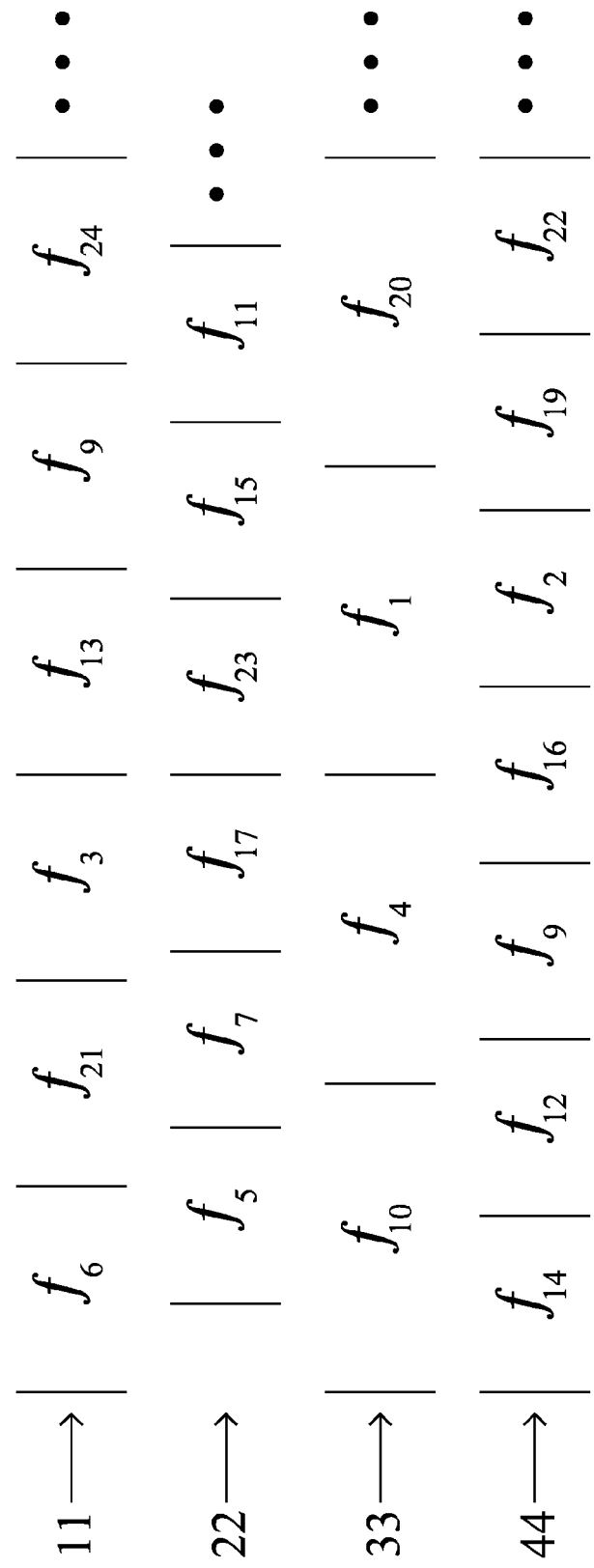
FIG. 5 illustrates example independently determined and independently timed unicast frequency-hopping sequences.

FIG. 5 illustrates another example of independently determined frequency hopping sequences 300 that may be computed by each individual device 200 in network 100. Note how there is generally no overlap at any given time (a goal of scheduling process 248, but not a necessity), and that certain frequencies may be re-used at different times. Note also that, contrary to FIG. 4B, the schedules are completely independent, that is, they are not simply an offset of the same order, and the slots do not generally line up between the devices.

A transmitter must learn and synchronize with a receiver's channel-hopping schedule to successfully transmit unicast messages to it. Accordingly, each device 200 may share their local unicast listening schedule with its neighbors, such that each device 200 can correspondingly discovering a neighbor unicast listening schedule for each neighbor. As mentioned above, a node/device 200 includes information about its unicast schedule in various link frames (data transmissions 140) to allow neighboring nodes to synchronize to its unicast schedule. The information may generally include the phase information, i.e., the amount of time that has elapsed between a "Start-of-Frame" transmission and the start of the current unicast timeslot, and slot information, i.e., the slot number during which the Start-of-Frame was transmitted.

Having each device 200 maintain its own channel-hopping schedule increases overall throughput of the network since different transmitter-receiver pairs can use multiple channels simultaneously. Requiring each transmitter to synchronize with each receiver independently increases overall robustness, since any synchronization errors will be localized to the affected transmitter-receiver pair.

Pursuant to the hybrid approach discussed above, in addition to the unicast listening schedules, all nodes/devices 200 in the same network synchronize to a common broadcast schedule that simultaneously overlays a configured portion of all unicast listening schedules in the network. There is generally no coordination of broadcast schedules between different networks. A broadcast schedule may be defined by the following parameters:

1) Channel Sequence: a list of channels, e.g., indexed by a 16-bit integer, that a mesh interface follows when listening for broadcast transmissions. Each entry in the Channel Sequence may be determined by a function that takes a unique identifier of the network (e.g., an IEEE 802.15.4 personal area network or "PAN" ID) and the list index. Using the network ID helps ensure that neighboring networks (e.g., PANs) do not follow the same pseudo-random sequence and reduces the chance of repeated collisions by neighboring networks.

2) Slot Duration: the broadcast schedule divides time into equal sized slots. At the beginning of each slot, the node switches to the next channel in the broadcast schedule for listening.

Figure 6:
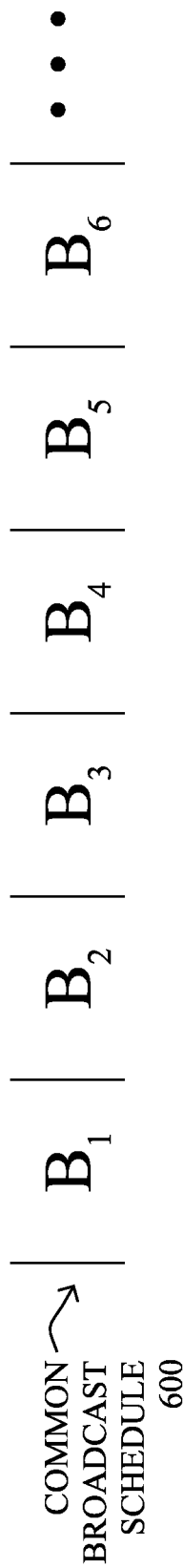
FIG. 6 illustrates an example broadcast frequency-hopping sequence.
Figure 7A:
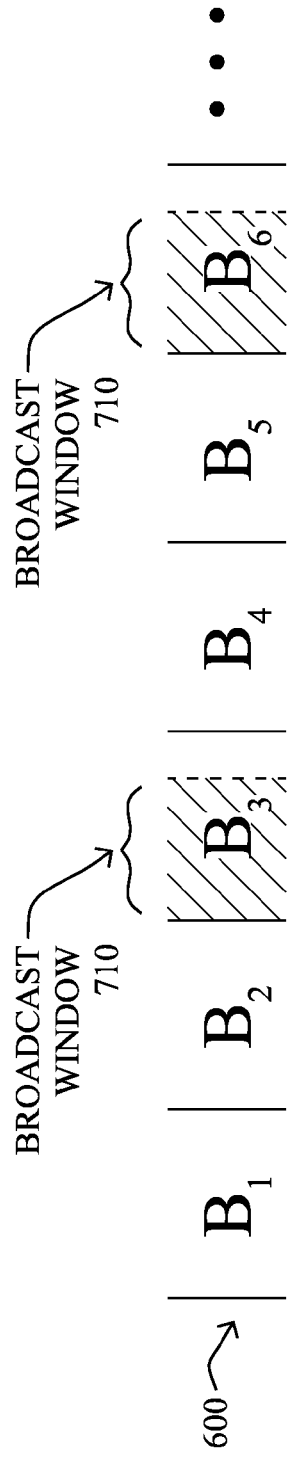
FIGS. 7A-7B illustrate example overlay broadcast schedules.

FIG. 6 illustrates an example broadcast schedule (sequence) 600, showing example frequencies $B_1$-$B_6$. All nodes/devices 200 in the network would synchronize to only one broadcast schedule. The slot timing of broadcast slots in the common broadcast schedule may generally be independent of slot timing of unicast slots in the local unicast listening schedule. While the broadcast schedule 600 is shown with a frequency or channel designated in each timeslot (from which particular portions are selected for use), the techniques herein may also simply populate the schedule with those broadcast slots that are to be used (e.g., only $B_3$ and $B_6$, as described below). The broadcast schedule 600 may be established by a single root node (e.g. device 11) and distributed to all other nodes (e.g. devices 22, 33, and 44) using any standard dissemination protocol (e.g., simple flood, Trickle-based dissemination, etc.). The dissemination protocol may utilize unsynchronized transmissions, particularly where no schedule has yet been established. The root node may be administratively assigned (e.g., an IEEE 802.15.4 PAN coordinator, Field Area Router, etc.) or automatically discovered (e.g., a smallest IEEE 802.15.4 IEEE EUI-64). A broadcast schedule may be defined by the following parameters:

3A) Broadcast Window: specifies how long a node/device listens for broadcast messages within a broadcast slot. FIG. 7A illustrates an example of broadcast windows 710, during which the common broadcast schedule is to be used (a configured portion overlaying the unicast schedules). Broadcast windows may be found in only specific timeslots as shown, or else may be the initial portion (e.g., one or more sub-timeslots) of every timeslot of the sequence. Broadcast packets must start their transmission within the Broadcast Window to ensure that all neighboring nodes are listening for the broadcast transmission. The Broadcast Window must specify a time that is no greater than the Slot Duration. At the beginning of each designated broadcast slot, the node/device switches to the next channel in the broadcast schedule to listen for broadcast transmissions. At the end of the Broadcast Window, the node/device returns to listening for unicast transmissions until the start of the next broadcast slot. The unicast schedule is free running and the timing remains unaffected by the broadcast schedule. In other words, the broadcast schedule is overlaid on a node/device's unicast schedule. In one embodiment, the Broadcast Window may utilize one or more sub-timeslots starting at different offsets within each broadcast slot. For example, the Broadcast Window may start on sub-slot X in slot 1, Y in slot 2, Z in slot 3, etc. The sub-slot start time may be specified as part of the broadcast channel sequence, where each slot indicates not only channel but sub-slot offset.

Figure 7B:
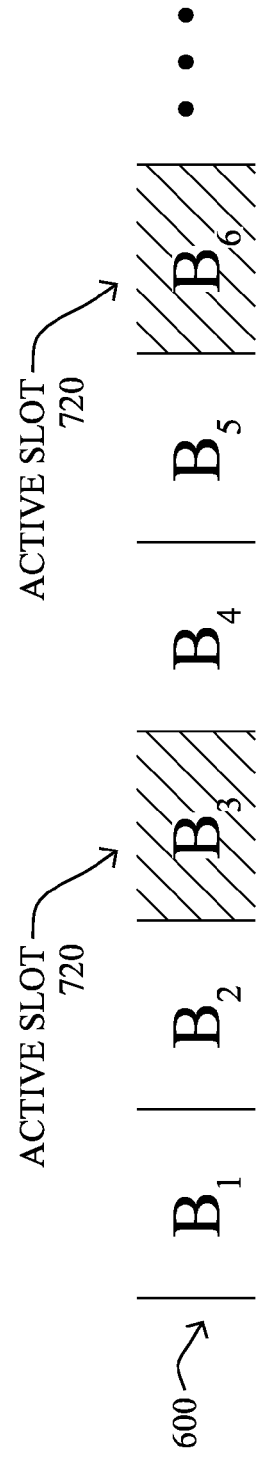

3B) Active Slot Period (instead of or in addition to a Broadcast Window): specifies which slots within a broadcast schedule are used to listen for broadcast transmissions. For example, an Active Slot Period of 10 would indicate that the node listens for broadcast communication every tenth slot of the broadcast schedule. During the other 9 out of 10 slots, the device follows its own unicast schedule and listens for unicast communication. FIG. 7B illustrates an example of an active slot period (e.g., of 3) where every third slot of the common broadcast schedule is a time during which the common broadcast schedule is to be used (e.g., corresponding to $B_3$ and $B_6$).

Notably, the configured portion of the common broadcast schedule that is used to overlap the unicast schedules, e.g., the Broadcast Window size and/or Active Slot Period, can be adjusted to configure the amount of time that a network spends listening for broadcast traffic rather than unicast traffic, as described in greater detail below.

According to the hybrid method, the common broadcast schedule 600 overlays each individual device's unicast listening schedule/frequency hopping sequence 300, such that devices 200 operate in a receive mode (listening for transmissions) according to the local unicast listening schedule and the common broadcast schedule during the overlaid configured portion, and operate in a transmit mode according to each neighbor unicast listening schedule and the common broadcast schedule during the overlaid configured portion depending upon a destination of transmitted traffic.

FIG. 8 illustrates the overlay of the broadcast schedule 600 over the independent frequency hopping schedules 300 of each device 11, 22, 33, and 44 in network 100. For instance, as can be seen, device 11 listens to its local unicast listening schedule/frequency hopping schedule unless the particular overlaid portion of the broadcast schedule dictates that device 11 listen on the broadcast channel at the time. Should device 11 wish to send a transmission to any of its neighbor devices (e.g. 22, 33, or 44), device 11 uses the neighbor's listening schedule according to whether a unicast message or broadcast message is to be used. In FIG. 8, the leftmost broadcast slot shows an active broadcast slot period 720, while the rightmost broadcast slot shows a broadcast window 710, though this is merely for illustration. Furthermore, a combination of slot period 720 and broadcast window 710 may be used, e.g., defining which particular slots of a broadcast schedule to use (period 720), and then further defining a length of time for each of those slots to use (window 710).

All unicast link frames are thus sent using the receiver's (neighbor's) unicast schedule, which is maintained by the link layer. However, if the intended receiver is not resident in the neighbor table, then the message is passed back to higher layers with an error condition, which, as discussed above, is a drawback of the current hybrid method. Otherwise, the transmitter determines the appropriate channel given the current time and begins transmission (e.g., transmitting a unicast message to a particular neighbor during a unicast slot based on the corresponding neighbor unicast listening schedule for the particular neighbor).

In addition, all broadcast link frames are sent using the network's broadcast schedule, which is maintained by the link layer. However, if the broadcast schedule is unknown, the message is passed back to higher layers with an error condition, which again, is a drawback of the current hybrid method. Otherwise, the transmitter waits until the next broadcast window, selects the appropriate channel, and begins transmission at that time (e.g., transmitting a broadcast message into the network during a broadcast slot based on the common broadcast schedule).

Separating unicast and broadcast traffic may be beneficial in cases where broadcast traffic is used for critical network control or application functions. However, the network may optionally be configured to allow transmission of unicast frames during a broadcast slot while the network is actively listening for broadcast transmissions. Doing so reduces communication delays and aggregate capacity for unicast traffic, but comes at the risk of interfering with broadcast traffic.

A synchronized transmission starts within the intended unicast or broadcast slot but does not need to end within the same slot. That is, a link frame transmission only utilizes a single channel and link frames are not fragmented across different channels. Once a node begins receiving a link frame, it will continue receiving the frame until the end of transmission.

Furthermore, synchronized transmissions should take into account any of the uncertainties in time synchronization. Such uncertainties may be due to frequency tolerances of device's clock sources and interrupt processing jitter when time stamping events. To account for these uncertainties, devices should not begin transmissions near the start or end of a unicast slot or a broadcast listen window. Instead, devices should schedule their transmissions outside of such slots/windows.

Additionally, unicast transmissions typically request an acknowledgment. Acknowledgment frames may thus be sent using the same channel as the received frame being acknowledged. Utilizing the same channel for sending the acknowledgment removes the channel switch overhead on both the transmitter and receiver. Because acknowledgment frames are transmitted without a clear-channel assessment, the acknowledgment transmission may continue to use the same channel originally acquired by the frame being acknowledged.

Figure 9:
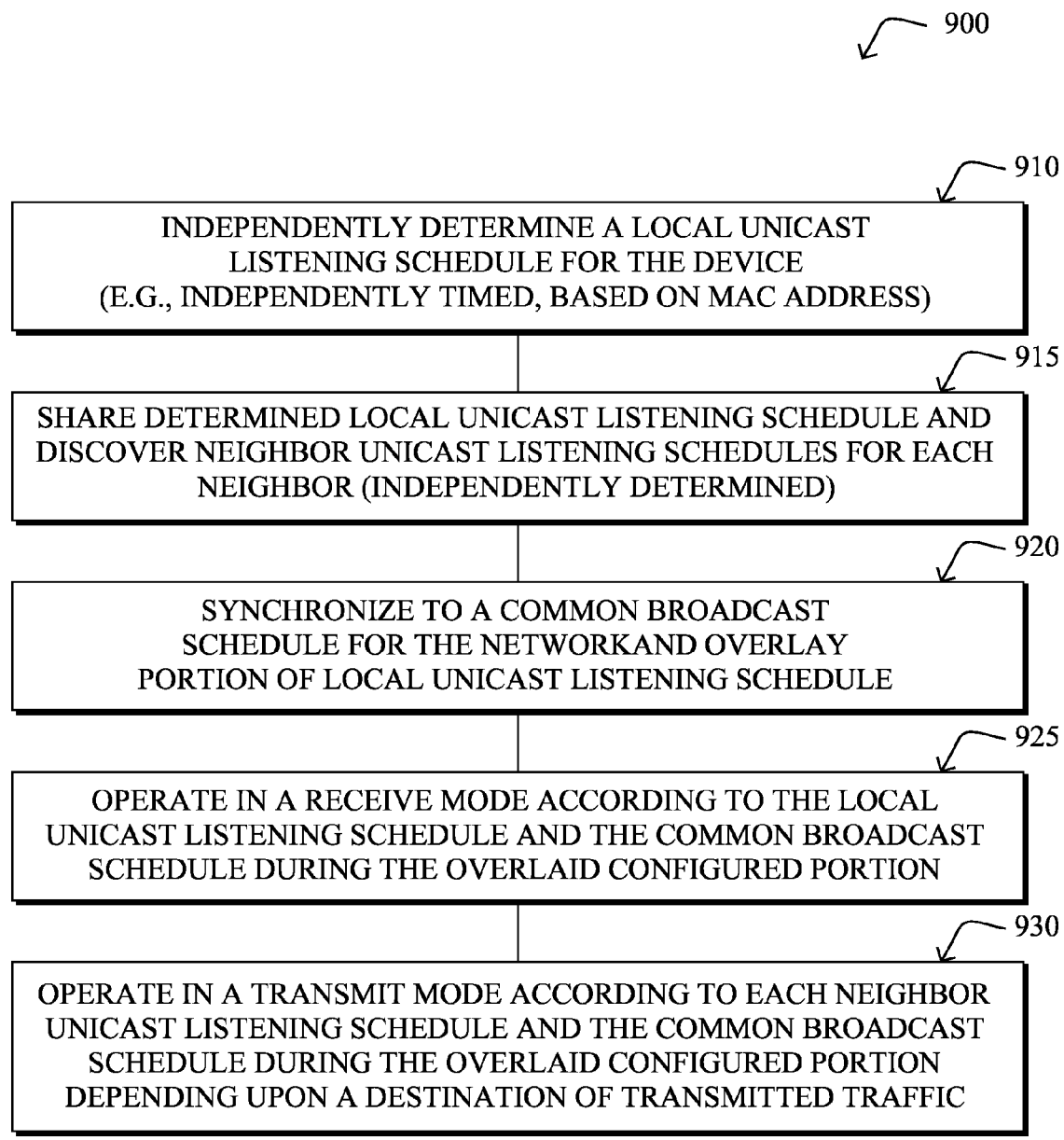
FIG. 9 illustrates an example simplified hybrid method for providing optimized unicast and broadcast schedules in frequency-hopping computer networks.

FIG. 9 illustrates an example simplified procedure 900 for providing optimized unicast and broadcast schedules in frequency-hopping computer networks in accordance with the illustrative hybrid method described above (e.g., overlaying the common broadcast schedule over the independent unicast schedules).

At step 910, as described in detail above, a device independently determines its local unicast listening schedule (e.g., frequency hopping sequence 300). For example, the local unicast listening schedule can be independently timed (where the slots don't need to line up with neighbors' slots), and may be based on a MAC address or other unique ID of the device to avoid overlap with other nearby devices.

At step 915, the local unicast listening schedule is shared with the device's neighbors and neighbor unicast listening schedules for each neighbor device (also independently determined) may be received and discovered from the device's neighbors.

At step 920, the device synchronizes to a common broadcast schedule (e.g. broadcast schedule 600) for the network that simultaneously overlays a configured portion of all unicast listening schedules in the network (e.g., as shown above in FIG. 8). As described above, the actual broadcast portions may be adjusted through received configurations, such as to extend or reduce a broadcast window, increase or decrease a number of broadcast slots, etc.

At step 925, the device operates in a receive mode according to the local unicast listening schedule and the common broadcast schedule during the overlaid configured portion, as described in detail above. For instance, the device listens to the network for unicast traffic based on its local unicast listening schedule, unless it is during a portion of the schedule that is overlaid by the broadcast schedule, at which time the device listens for broadcast traffic.

For any transmissions to be sent from the device, at step 930 the device may correspondingly operate in a transmit mode. The transmit mode operates according to each neighbor unicast listening schedule and the common broadcast schedule during the overlaid configured portion, depending upon a destination of transmitted traffic. For example, as illustrated above, if device 11 is to transmit a unicast packet to device 22, device 11 determines the appropriate frequency/channel based on the listening schedule of device 22 at the time the transmission is to occur, and then transmits the unicast packet, accordingly. If device 11 has a broadcast packet to transmit, then it may wait (if necessary) for the next broadcast window/slot, and transmit the broadcast packet at the specified broadcast frequency.

Using the steps outlined above, devices 200 will have the ability to update unicast and/or broadcast schedules, to receive messages, and/or to transmit messages to any devices in network 100. Certain steps within procedure 900 may be optional, and the steps shown in FIG. 9 are merely examples for illustration, and certain other steps may be included or excluded as desired. Furthermore, while a particular order of the steps is shown, this ordering is merely illustrative, and any suitable arrangement of the steps may be utilized without departing from the scope of the illustrative technique.

The hybrid method described above, therefore, provides for unicast and broadcast schedules in a frequency-hopping network. By overlaying independent unicast schedules with a common broadcast schedule, a system in accordance with the illustrative technique:

1) Increases aggregate network capacity for unicast communication by utilizing independent channel-hopping schedules;
2) Reduces the likelihood of repeated unicast collisions between neighboring transmitter-receiver pairs by using a pseudo-random function that takes the MAC address as a parameter;
3) Increases efficiency of broadcast communication by synchronizing all nodes/devices to a common broadcast schedule;
4) Reduces the likelihood of repeated broadcast collisions between neighboring networks by using a pseudo-random function that takes the network ID as a parameter;
5) Optionally allows unicast traffic during broadcast slots to increase aggregate unicast capacity (at the cost of increased collisions with broadcast traffic);
6) Allows devices to maintain their own unicast schedule independent of other devices and the broadcast schedule, leading to simpler configuration and management;
7) Allows the broadcast schedule to be maintained independently of the unicast schedule, allowing the broadcast schedule to be reconfigured for changes in the distribution between unicast and broadcast communication; and
8) Allows each transmitter-receiver pair to maintain their own synchronization independently, limiting the scope of any synchronization errors to the transmitter-receiver pair.

However, the hybrid method described above still has some significant drawbacks. For example, each device will require a fairly large amount of memory to store the independently determined unicast schedules for all neighboring devices. In addition, if a unicast or broadcast message cannot be delivered (due to, e.g., a device not having a unicast schedule for a particular neighboring device, errors in transmission during a unicast or broadcast schedule, etc.), an error message is sent to an upstream device and the unicast/broadcast message is lost.

On-Demand Pair-Wise Frequency Hopping Synchronization

The techniques herein provide an on-demand approach to utilizing and maintaining unicast schedules with neighboring devices, which uses the basics of the hybrid method described above and addresses many of the drawbacks of the hybrid method, and maintaining pair-wise unicast schedules in a channel-hopping network, such as an LLN. Rather than proactively establishing and maintaining unicast schedule information for all neighboring devices, devices only synchronize with unicast schedules for neighboring devices as needed. In particular, if no unicast schedule information for a neighboring device is known when sending a unicast data frame, the broadcast schedule is used. The device then synchronizes to the unicast schedule information contained in the acknowledgment from the neighboring device and utilizes that for subsequent communication. A device may place unicast schedule information in each link frame (e.g. data and acknowledgements) to allow a receiver of the frames to synchronize to the transmitter's unicast schedule. Through configuration or information contained in packets, the techniques herein specify which neighbors, when, and how long to maintain a particular neighbor unicast schedule.

Illustratively, the techniques herein may be performed by hardware, software, and/or firmware, such as in accordance with scheduling process 248 and/or MAC layer module 212, which may each include computer executable instructions executed by a processor (e.g., processor 220 or an independent processor within the network interface 210) to perform functions relating to the novel techniques described herein, such as, e.g., as part of a frequency hopping communication protocol. For example, the techniques herein may be treated as extensions to conventional wireless communication protocols, such as the IEEE 802.11 protocol, IEEE 802.15.4, WiFi, etc., and as such, would be processed by similar components understood in the art that execute such protocols.

Figure 10:
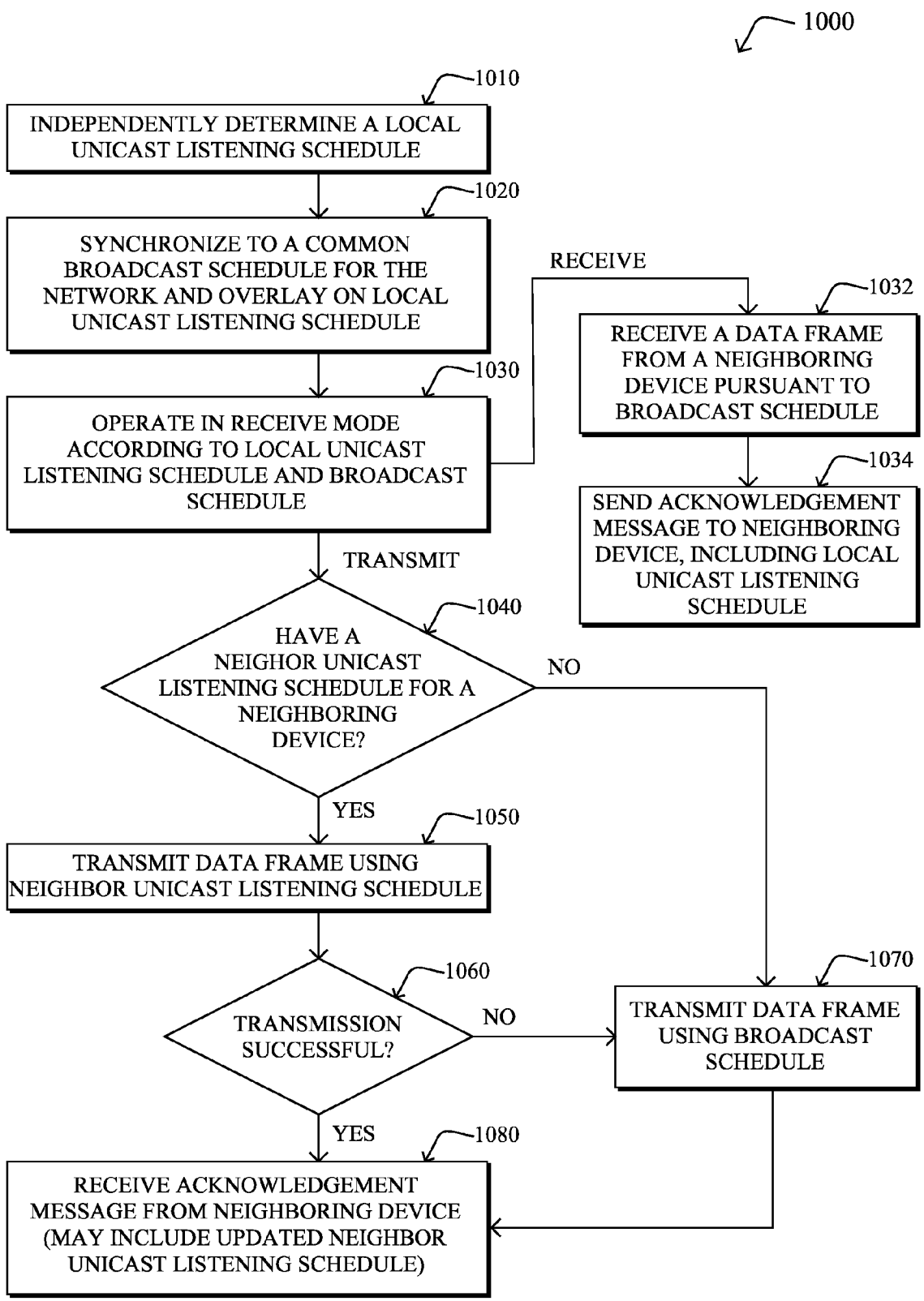
FIG. 10 illustrates an example simplified process for providing on-demand pair-wise frequency hopping synchronization in frequency-hopping computer networks.

Referring to FIG. 10, an illustrative process 1000 is shown using the techniques described herein. At step 1010, a device independently determines its local unicast listening schedule (e.g., frequency hopping sequence 300), as described above for step 910. At step 1020, the device synchronizes to a common broadcast schedule (e.g. broadcast schedule 600) for the network that simultaneously overlays a configured portion of all unicast listening schedules in the network, as described above for step 920.

At step 1030, the device operates in a receive mode according to the local unicast listening schedule and the common broadcast schedule during the overlaid configured portion, as described in step 925 above. When in receive mode, the device may receive a data frame from a neighboring device pursuant to the broadcast schedule, as shown in step 1032. In response to receipt of this data frame, at step 1034 the device will send an acknowledgement message back to the neighboring device that sent the data frame acknowledging receipt of the data frame and providing the neighboring device with the local unicast listening schedule for the device. In the future, the neighboring device can then send unicast data frames directly to the device pursuant to the local unicast listening schedule.

For any transmissions/data frames to be sent from the device, the device may correspondingly operate in a transmit mode. In the transmit mode, at step 1040, the device first determines if a unicast listening schedule is available for a particular neighboring device by looking up the unicast schedule information for the destination device.

If a unicast listening schedule is available for the neighboring device, at step 1050 the device transmits the data frame to the neighboring device pursuant to the neighboring devices' unicast listening schedule. If a unicast listening schedule is not available for the neighboring device, the process continues with step 1070 below.

At step 1060, the device determines whether the transmission to the neighboring device was successful. This enables more robust link communication, by providing a backup method when transmission failures occur using existing unicast schedule information. In some cases, the schedule information may be erroneous (due to excessive clock drift, synchronization errors, etc.). With the techniques described herein, a device can invalidate an existing neighbor unicast schedule if "N" consecutive transmissions using that neighbor unicast schedule fails. Thus, the device can fall back to the broadcast schedule when sending the unicast data frame and attempt to resynchronize again. If the transmission was not successful, the process continues with step 1070. If the transmission was successful, the process continues with step 1080.

At step 1070, the device transmits the data frame to the neighboring device pursuant to the broadcast schedule, since a unicast listening schedule for the neighboring device is unknown. Because all nodes/devices in the network listen according to the same broadcast schedule, a device can transmit to any neighboring device during a broadcast slot. Alternatively, if the neighbor unicast schedule for a particular neighbor is not known, the device may be allowed to alter their next-hop selection based on what neighbors they have neighbor unicast schedules for. Consider a device that has two next-hop routes for a data frame it is forwarding. One route may provide a better path cost but does not have neighbor unicast schedule information. The other route may have a higher path cost but does have neighbor unicast schedule information. While the first route provides a better route cost, it incurs additional latency because the device must wait for the next available broadcast slot. As a result, the device may choose to route a latency-sensitive packet to a neighbor device with a higher path cost because the device does not need to wait for the next broadcast slot. The device may limit the use of such alternative routes based on a maximum increase on the routing stretch.

At step 1080, the device receives and acknowledgement message from the neighboring device that verifies that the data frame was received. After successfully transmitting the unicast data frame, either pursuant to the neighbor unicast listening schedule or the broadcast schedule, the neighboring device (receiver) may send an acknowledgment frame back to the device, which may contain the neighbor unicast listening schedule for the neighboring device. As a result, the transmitting device can store and immediately synchronize with the neighboring device's unicast listening schedule and utilize it for subsequent unicast transmissions. At this point, the device can dynamically choose what neighbor unicast schedules to maintain. Because LLN devices typically operate with constrained memory resources, a device may not be able to maintain neighbor unicast schedule information for all neighboring devices. Therefore, in one example, the device may utilize a simple Least Recently Used (LRU) policy. Whenever a device communicates a unicast data frame and receives an acknowledgment, it stores the updated neighbor unicast schedule information. If the device must allocate a new entry and no memory is available, it will evict the LRU neighbor unicast information to reclaim that memory.

In another example, devices may be configured to maintain neighbor unicast schedules for neighbors that they will most likely communicate with. For example, when using the Routing Protocol for LLNs (RPL), devices may choose to always maintain unicast schedule information for their DODAG parents. Any remaining memory is managed based on the LRU policy above (e.g. when communicating with DODAG children).

In another example, the device may maintain an age value for each neighbor unicast schedule. When the age value exceeds acceptable synchronization error bounds caused by clock drift, the device expires the neighbor unicast schedule information. Alternatively, when the age value exceeds some threshold, the device may generate a unicast data frame to refresh the neighbor unicast schedule information. The tradeoff of whether to refresh the information involves communication (channel capacity and energy) overhead in refreshing the information vs. utilizing a broadcast slot in the future.

At one extreme, where a device must operate with minimal resources, the device need not maintain any unicast scheduling information for neighboring devices. In this case, the device will utilize a broadcast slot to transmit the initial unicast data frame. But subsequent transmissions soon after will be able to utilize the additional channel capacity provided by the neighbor unicast listening schedule.

Using the techniques described herein, a device may also be configured to determine how long to maintain and update neighbor unicast schedule information for a neighboring device. As mentioned above, devices may be configured to always maintain unicast schedule information for specific neighbors (e.g., DODAG Parents in a RPL tree). Alternatively, the data packets may contain a newly defined option (e.g., IPv6 Hop-by-Hop Option) that specifies how long to maintain the unicast schedule information along a path. Because a broadcast schedule is only active for a fraction of the time, one downside of transmitting unicast frames in a broadcast slot is an increase in communication latency. Another alternative to always maintaining unicast schedule information is to only refresh the information immediately before the next expected transmission to the neighbor. For example, if devices along a path maintain information about when a path will be used next, they can synchronize with the unicast schedule only when needed. In one embodiment, devices obtain such timing parameters using a newly defined option (e.g., IPv6 Hop-by-Hop Option) contained in the data packets that they forward.

In addition, using the techniques described herein, a device may be allowed to provide feedback to the LLN Border Router (LBR), which is the authoritative source of the broadcast schedule, regarding the size of the broadcast slot. When devices operate with much lower memory, they may utilize the broadcast slot more often. If the broadcast slot utilization increases beyond a threshold, the device may send a message to the LBR requesting to increase the broadcast slot duration and/or frequency. The LBR can then utilize the information from the entire network and choose to add or reduce capacity to the broadcast schedule.

The techniques described herein, therefore, provide for on-demand pair-wise frequency-hopping synchronization in a shared-media communication network. In particular, the techniques herein may significantly reduce the cost (memory, communication, and energy) of maintaining unicast schedule information with neighboring devices. That is, rather than proactively maintaining unicast schedule information with neighboring devices, nodes according to the techniques herein need only maintain a single broadcast schedule. This allows devices to effectively communicate with any neighboring devices regardless of the number of neighbors. Furthermore, the on-demand approach provides a method to communicate when unicast schedules become invalid or erroneous, allowing a more robust network.

Still further, the known time-synchronized mesh protocol (TSMP) is an integrated link and network-layer protocol that strictly schedules all traffic flows. TSMP (and other examples, such as time-synchronized channel-hopping or "TSCH", WirelessHART, and ISA100.11a) utilizes a channel-hopping strategy that allows both unicast and multicast slots. Note that the multicast slots are not broadcast slots since they are not network-wide. A central gateway device computes the hopping schedule for each transmitter-receiver pair. The schedules are distributed using the wireless network. This centralized method adds significant delay and communication overhead to coordinate new schedules between transmitter-receiver pairs.

While there have been shown and described illustrative embodiments that provide for on-demand pair-wise frequency-hopping synchronization, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared media networks and/or protocols using frequency hopping, such as certain PLC protocols. Also, while the description above relates to packets, the techniques may be equally applicable to non-packetized transmissions. Moreover, while the above description is specifically discussed synchronized transmissions, it is possible to allow for various unsynchronized transmissions when it is desirable to do so.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving a broadcast schedule and storing the broadcast schedule in a memory;
    determining, using a processor, if a neighbor unicast listening schedule is available for a neighboring device;
    when the neighbor unicast listening schedule is available, transmitting a data frame to the neighboring device pursuant to the neighbor unicast listening schedule; and
    when the neighbor unicast listening schedule is not available, transmitting the data frame to the neighboring device pursuant to the broadcast schedule.

2. The method of claim 1, further comprising:
    when the neighbor unicast listening schedule is not available, determining if a neighbor unicast listening schedule is available for an alternate neighboring device;
    when the neighbor unicast listening schedule for the alternate neighbor device is available, transmitting the data frame to the alternate neighbor device; and
    when the neighbor unicast listening schedule for the alternate neighbor device is not available, transmitting the data frame to the neighboring device pursuant to the broadcast schedule.

3. The method of claim 1, further comprising:
    determining if the transmission of the data frame pursuant to the neighbor unicast listening schedule was successful; and
    in response to determining that the transmission was not successful, in-validating the neighbor unicast listening schedule and transmitting the data frame to the neighboring device pursuant to the broadcast schedule.

4. The method of claim 3, wherein it is determined that the transmission of the data frame is not successful when an acknowledgement data frame is not received from the neighboring device after a predetermined number of transmission attempts.

5. The method of claim 1, further comprising receiving an acknowledgement data frame from the neighboring device, wherein the acknowledgement data frame comprises the neighbor unicast listening schedule.

6. The method of claim 5, wherein the neighbor unicast listening schedule is stored in the memory.

7. The method of claim 6, wherein a last recently used unicast listening schedule is removed from the memory.

8. The method of claim 1, further comprising determining a local unicast listening schedule and receiving data transmissions from neighboring devices pursuant to the unicast listening schedule and the broadcast schedule.

9. An apparatus, comprising:
    a network interface adapted to communicate over a network;
    a processor configured to communicate with the network interface; and
    a memory configured to communicate with the processor, the memory having instructions stored thereon that, in response to execution by the processor, cause the processor to perform operations comprising;
    receiving a broadcast schedule and storing the broadcast schedule in the memory;
    determining if a neighbor unicast listening schedule is available for a neighboring device;
    when the neighbor unicast listening schedule is available, transmitting a data frame to the neighboring device pursuant to the neighbor unicast listening schedule; when
    when the neighbor unicast listening schedule is not available, transmitting the data frame to the neighboring device pursuant to the broadcast schedule.

10. The apparatus of claim 9, further comprising:
    when the neighbor unicast listening schedule is not available, determining if a neighbor unicast listening schedule is available for an alternate neighboring device;

when the neighbor unicast listening schedule for the alternate neighbor device is available, transmitting the data frame to the alternate neighbor device; and when the neighbor unicast listening schedule for the alternate neighbor device is not available, transmitting the data frame to the neighboring device pursuant to the broadcast schedule.

11. The apparatus of claim 9, further comprising:

determining if the transmission of the data frame pursuant to the neighbor unicast listening schedule was successful; and in response to determining that the transmission was not successful, in-validating the neighbor unicast listening schedule and transmitting the data frame to the neighboring device pursuant to the broadcast schedule.

12. The apparatus of claim 11, wherein it is determined that the transmission of the data frame is not successful when an acknowledgement data frame is not received from the neighboring device after a predetermined number of transmission attempts.

13. The apparatus of claim 9, further comprising receiving an acknowledgement data frame from the neighboring device, wherein the acknowledgement data frame comprises the neighbor unicast listening schedule.

14. The apparatus of claim 13, wherein the neighbor unicast listening schedule is stored in the memory.

15. The apparatus of claim 14, wherein a last recently used unicast listening schedule is removed from the memory.

16. The apparatus of claim 9, further comprising determining a local unicast listening schedule and receiving data transmissions from neighboring devices pursuant to the unicast listening schedule and the broadcast schedule.

17. A tangible non-transitory computer-readable storage medium having computer-executable instructions stored thereon that, when executed by a processor, cause the processor to perform operations comprising:

determining a local unicast listening schedule and storing the local unicast listening schedule in a memory;

receiving a broadcast schedule and storing the broadcast schedule in the memory;

receiving a first data frame pursuant to the broadcast schedule and, in response to receipt of the first data frame, transmitting a first acknowledgement message, the acknowledgement message including the local unicast listening schedule;

determining if a neighbor unicast listening schedule is available for a neighboring device;

when the neighbor unicast listening schedule is available, transmitting a second data frame to the neighboring device pursuant to the neighbor unicast listening schedule; and when the neighbor unicast listening schedule is not available, transmitting the second data frame to the neighboring device pursuant to the broadcast schedule.

18. The computer-readable medium of claim 17, further comprising receiving a second acknowledgement data frame from the neighboring device, wherein the second acknowledgement data frame comprises the neighbor unicast listening schedule.

19. The computer-readable medium of claim 17, further comprising:

determining if the transmission of the second data frame pursuant to the neighbor unicast listening schedule was successful; and in response to determining that the transmission was not successful, in-validating the neighbor unicast listening schedule and transmitting the second data frame to the neighboring device pursuant to the broadcast schedule.

20. The computer-readable medium of claim 19, wherein it is determined that the transmission of the data frame is not successful when an acknowledgement data frame is not received from the neighboring device after a predetermined number of transmission attempts.

* * * * *